US010641382B2

(12) United States Patent
Vermeersch et al.

(10) Patent No.: US 10,641,382 B2
(45) Date of Patent: May 5, 2020

(54) SHIFT CONTROL DEVICE FOR AN AUTOMATIC TRANSMISSION

(71) Applicant: Steering Solutions IP Holding Corporation, Saginaw, MI (US)

(72) Inventors: Michael C. Vermeersch, Essexville, MI (US); Arthur W. Nellett, Davison, MI (US); Ravi Ravindra, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 932 days.

(21) Appl. No.: 15/239,167

(22) Filed: Aug. 17, 2016

(65) Prior Publication Data

US 2016/0356376 A1 Dec. 8, 2016

Related U.S. Application Data

(62) Division of application No. 13/804,822, filed on Mar. 14, 2013, now Pat. No. 9,447,866.

(51) Int. Cl.
*F16H 61/24* (2006.01)
*F16H 59/04* (2006.01)

(52) U.S. Cl.
CPC ........... *F16H 59/044* (2013.01); *F16H 61/24* (2013.01); *F16H 2061/241* (2013.01); *Y10T 74/2014* (2015.01)

(58) Field of Classification Search
CPC ........ F16H 59/04; F16H 59/044; F16H 61/24; F16H 2061/241

(Continued)

(56) References Cited

U.S. PATENT DOCUMENTS 7,196,453 B2  3/2007  Izenson et al.
2003/0173863 A1*  9/2003  Butera ................ E05B 47/0009
                                                310/307

(Continued)

FOREIGN PATENT DOCUMENTS

DE         19920650 A1    11/2000
DE      102005026048 B3    1/2007

OTHER PUBLICATIONS

Machine Translation of DE19920650, Inventor Schneider, published Nov. 2000, 12 pages.

*Primary Examiner* — William C Joyce
(74) *Attorney, Agent, or Firm* — Dickinson Wright PLLC

(57) ABSTRACT

A shift control device for an automatic transmission comprises a shift control member configured for manipulation by an operator to control a shift mechanism of a vehicle transmission, and an artificial feel mechanism coupled to the shift control member for providing tactile feedback. The artificial feel mechanism comprises a sensor, a controller, and a piezoelectric element. The sensor is configured for detecting a position of the shift mechanism and sending a signal that is indicative of the position. The controller is configured for receiving the signal, determining a control voltage, and providing the control voltage to the piezoelectric element. The piezoelectric element is configured and arranged so as to receive the control voltage and to apply a mechanical force that depends upon the control voltage and that is configured and applied so as to mechanically resist movement of the shift control member relative to the shift control bracket.

7 Claims, 5 Drawing Sheets

(58) Field of Classification Search
USPC .................. 74/473.21, 473.23, 473.3, 473.33
See application file for complete search history.

(56) References Cited

U.S. PATENT DOCUMENTS

| | | |
|---|---|---|
| 2003/0188594 A1 | 10/2003 | Levin et al. |
| 2013/0327173 A1* | 12/2013 | Iwata .................... F16H 59/105 |
| | | 74/473.12 |
| 2014/0260749 A1 | 9/2014 | Vermeersch et al. |
| 2015/0268691 A1* | 9/2015 | Schaub .................... G05G 5/03 |
| | | 74/471 XY |

* cited by examiner

SHIFT CONTROL DEVICE FOR AN AUTOMATIC TRANSMISSION

CROSS-REFERENCES TO RELATED APPLICATIONS

This patent application is a divisional of U.S. patent application Ser. No. 13/804,822, filed Mar. 14, 2013 which is incorporated herein by reference in its entirety.

BACKGROUND

The present invention relates to a shift control device for an automatic transmission of a vehicle such as an automobile, and particularly, to a system for shifting a vehicle transmission and for providing improved tactile feel that is synchronized with the shifting operation.

Vehicles equipped with an automatic transmission often include a shift control lever mounted on a console, the dashboard, or the steering column of the vehicle. A vehicle operator may manually move the shift control lever between shift lever positions so as to change the gear position in which the transmission is engaged and thereby actuate the transmission into a desired gear position.

In general, when an operator of a vehicle operates a control mechanism, such as a shift lever, the vehicle operator seeks feedback in order to know how hard or how far to push or pull or turn the lever. In some cases, the feedback is provided visually by a display. Additional feedback may also be provided in the form of tactile feel. When an operator encounters feedback in the form of tactile feel, the operator senses a tendency in the control mechanism toward or away from a particular position of the control actuator (e.g., lever, knob, dial, or wheel). To overcome the tendency, the operator typically must oppose it with an increased level of force.

A shift control lever may employ a leaf spring mechanism within the transmission to help overcome the frictional forces of the shift control lever and the associated linkage system and to aid in completing a shifting operation in the event the operator fails to independently complete the shifting operation. In systems where the frictional forces are excessive, or where excessive play may develop between the shift control lever and the associated linkage system, the shift control lever and its associated linkage system may become misaligned from the transmission. In addition, the imposition of frictional forces at points in the linkage system between the transmission and the shift control lever can result in a loss of tactile feel at the shift control lever.

Accordingly, it is desirable to have a system for shifting a vehicle transmission that provides improved tactile feel to the operator and that can be synchronized with shifting operations within the transmission.

SUMMARY OF THE INVENTION

According to one aspect of the invention, a shift control device for an automatic transmission comprises a shift control bracket mounted to a vehicle, a shift control member configured for manipulation by an operator so as to effect control over a shift mechanism of a vehicle transmission, and an artificial feel mechanism mechanically coupled to the shift control member for providing tactile feedback through the shift control member.

The artificial feel mechanism comprises a sensor, a controller, and a piezoelectric element. The sensor is configured and arranged for detecting a position of the shift mechanism of the vehicle transmission and sending a signal that is indicative of the position of the shift mechanism. The controller is configured for receiving the signal, determining, based on the signal, a control voltage to be applied to the piezoelectric element, and providing the control voltage to the piezoelectric element. The piezoelectric element is configured and arranged so as to receive the control voltage and to apply a mechanical force that depends upon the control voltage and that is configured and applied so as to mechanically resist movement of the shift control member relative to the shift control bracket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
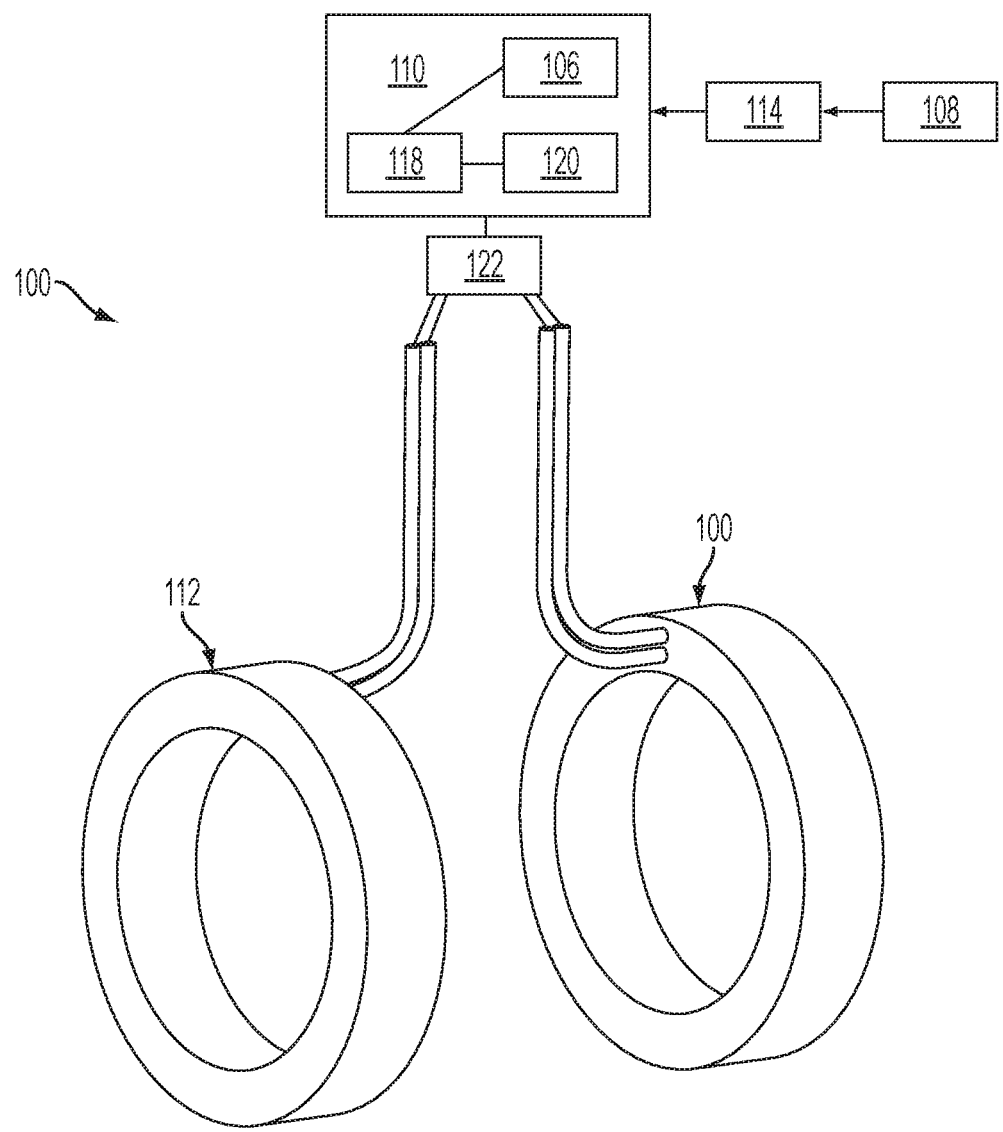
FIG. 1 shows a side view of an exemplary embodiment of two piezoelectric elements.

The following description is merely exemplary in nature and is not intended to limit the present disclosure, application, or uses. It should be understood that throughout the drawings, corresponding reference numerals indicate like or corresponding parts and features.

Figure 2:
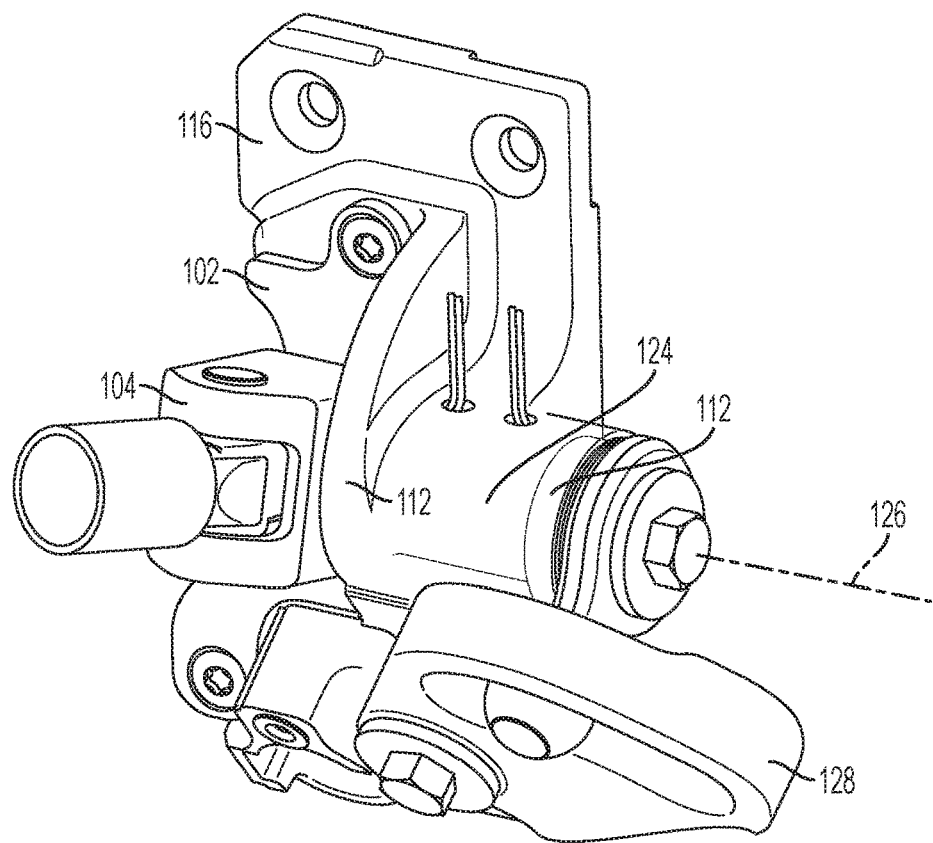
FIG. 2 shows a perspective view of an exemplary shift control device.
Figure 3:
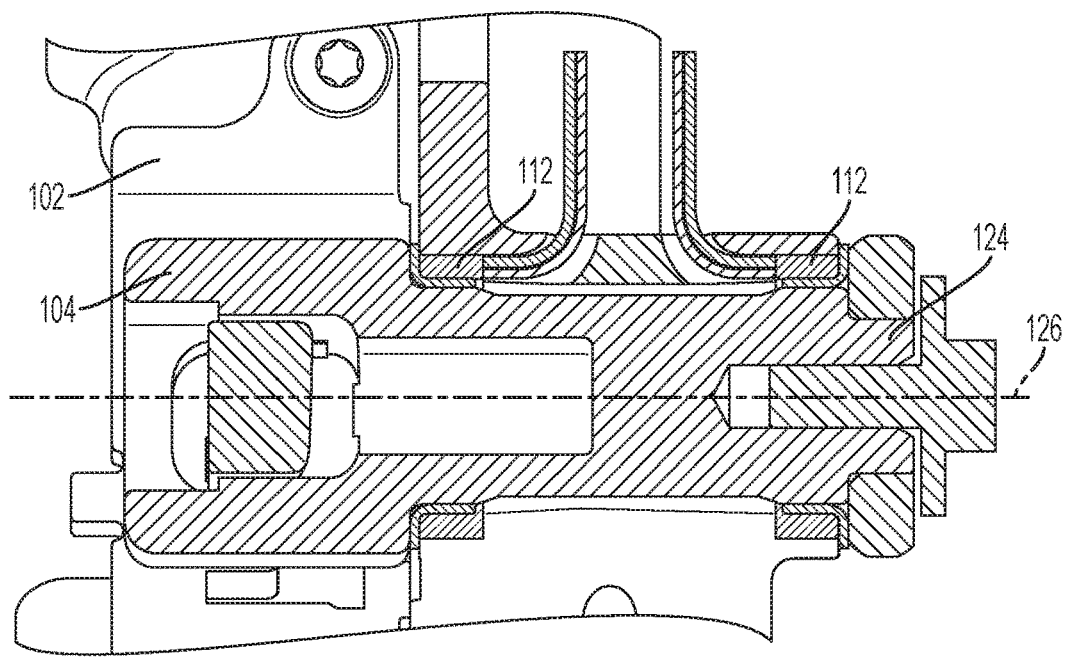
FIG. 3 shows a cutaway top view of the shift control device of FIG. 2.
Figure 4:
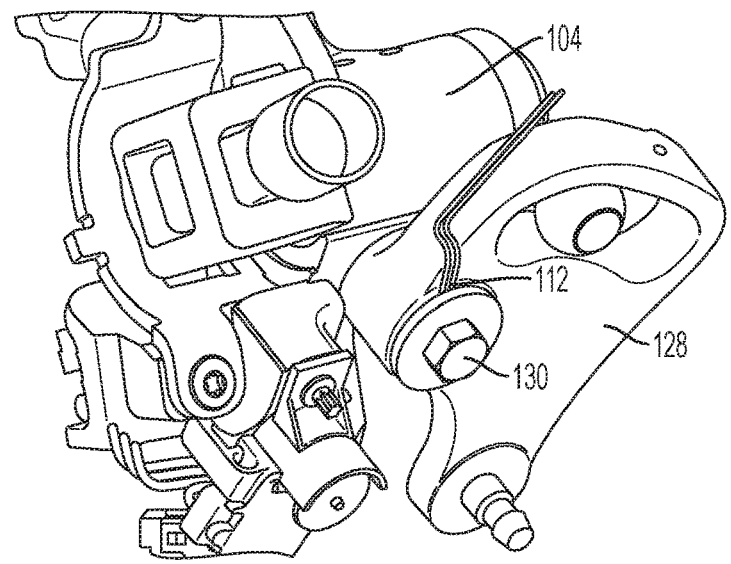
FIG. 4 shows a perspective view of an exemplary shift control device.
Figure 5:
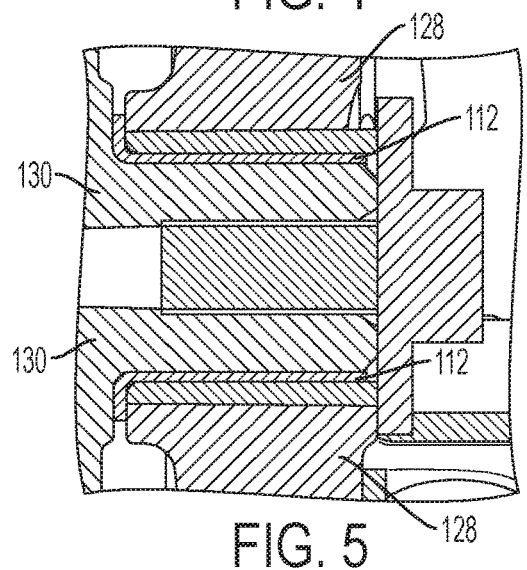
FIG. 5 shows a cutaway top view of the shift control device of FIG. 4.
Figure 6:
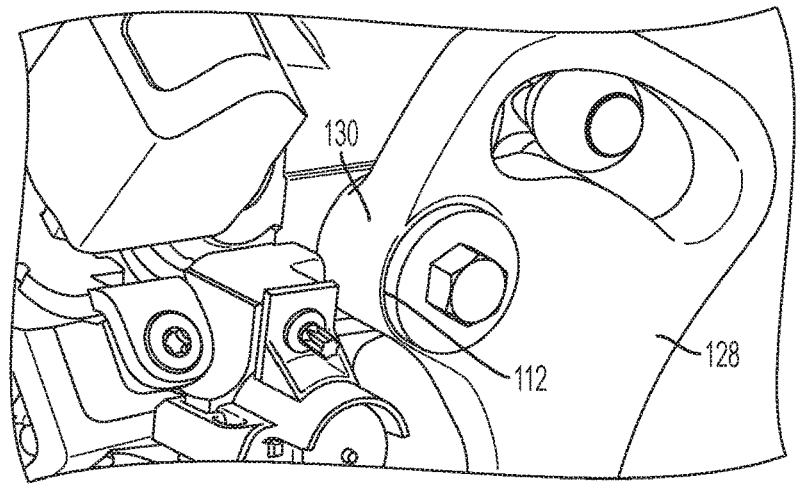
FIG. 6 shows a perspective view of the shift control device shown in FIG. 4.
Figure 7:
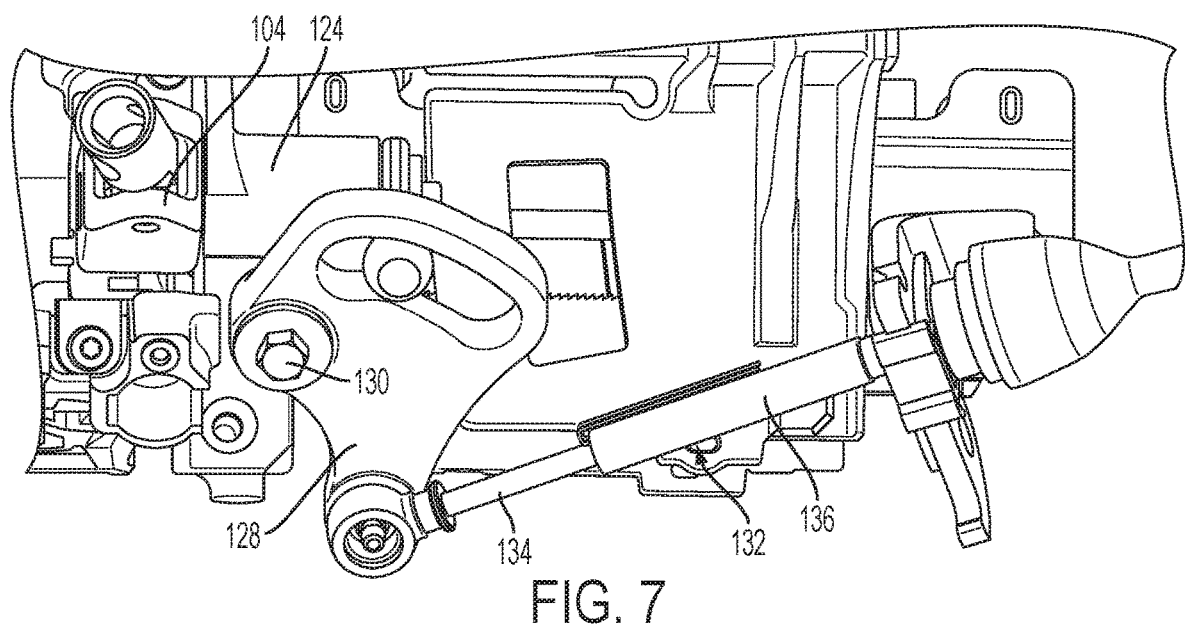
FIG. 7 shows a perspective view of an exemplary shift control device for an automatic transmission.
Figure 8:
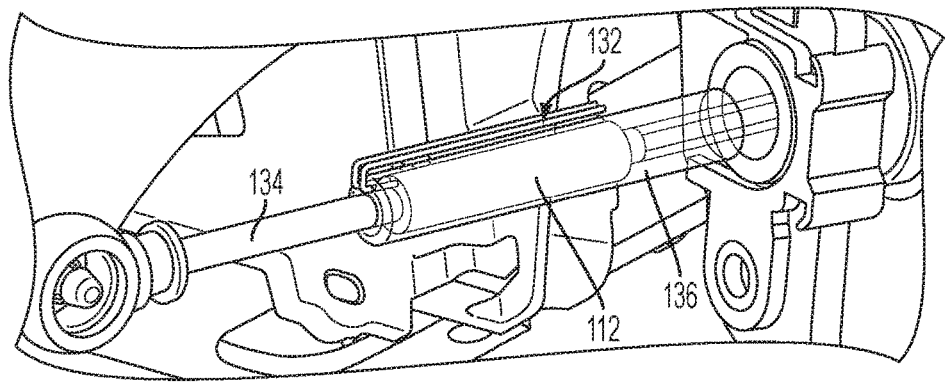
FIG. 8 shows a partial view of the shift control device shown in FIG. 7.
Figure 9:
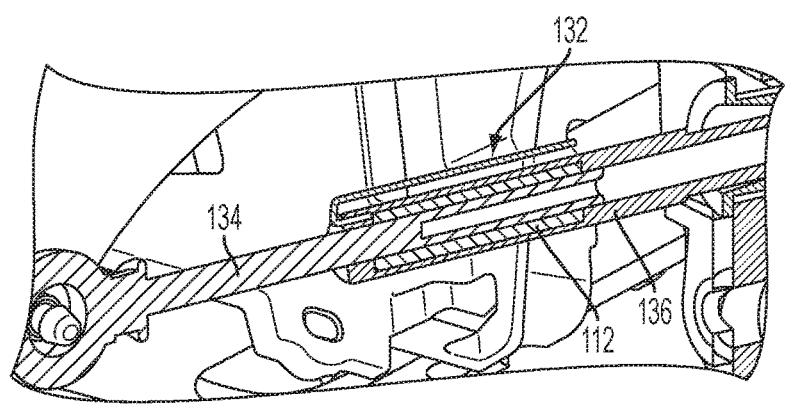
FIG. 9 shows a partial cutaway view of the shift control device shown in FIG. 7.
Figure 10:
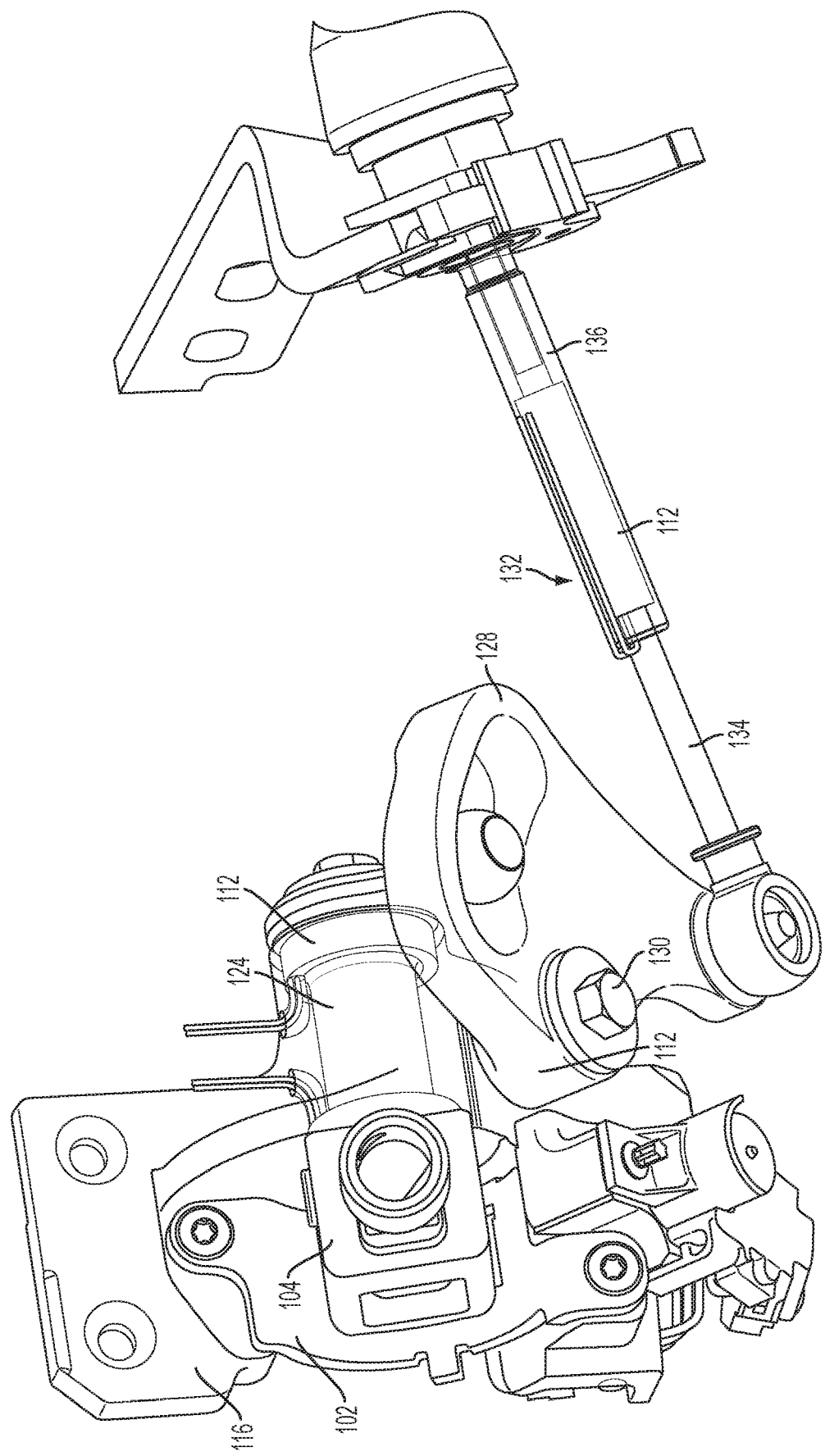
FIG. 10 shows a perspective view of a shift control device.

Referring now to the figures, where the invention will be described with reference to specific embodiments without limiting same, FIGS. 1-10 show various exemplary embodiments of a shift control device 100 for providing tactile feel to a vehicle operator as the vehicle operator manipulates the shift control device 100 so as to shift a transmission (not shown) of the vehicle. In accordance with the various embodiments disclosed herein, improved tactile feel may be provided to the operator with improved synchronization between tactile feedback and shifting actions accomplished within a transmission (not shown).

In an exemplary embodiment, a shift control device 100 for an automatic transmission comprises a shift control bracket 102 mounted to a vehicle structure 116, a shift control member 104 configured for manipulation by an operator so as to effect control over a shift mechanism of a vehicle transmission (not shown), and an artificial feel mechanism mechanically coupled to the shift control member 104 for providing tactile feedback through the shift control member 104. In an exemplary embodiment, the shift control bracket 102 is stationary relative to some other structures (such as the shift control member 104) and may actually be fixed to a structure 116 of the vehicle. The shift control member 104 is linked to the movement of the shifting mechanism of an automatic transmission such that as an operator shifts from one gear position to another, the shift control member 104 moves correspondingly. In an exemplary embodiment, the shift control member 104 is movable with at least one degree of freedom relatively to the shift control bracket 102. The degree of freedom may involve linear motion of a portion of the shift control device 100 or may involve rotational movement of the shift control member 104 or another component about an axis.

In an exemplary embodiment, the shift control bracket 102 is mounted so as to be mechanically coupled to a structure 116 of the vehicle such as a dashboard or a steering column or a floor console. The shift control member 104 cooperates with the shift control bracket 102 to define a path along which the shift control member 104 travels relative to the shift control bracket 102. In an exemplary embodiment, the shift control member 104 is coupled to the automatic transmission (not shown) such that a movement of the shift control member 104 to a first position along the path corresponds to actuation of the transmission into a first gear position.

It should be appreciated that a variety of means may be employed for coupling movement of a shift control device 100 to an automatic transmission. Exemplary means include mechanical linkages, transmission of optical or electronic signals, or other means known in the art. To reduce the occurrence of misalignment between the shift control member 104 and the automatic transmission or other controlled system, a supplemental artificial feel mechanism is provided. The artificial feel mechanism is configured to facilitate improved synchronization of movements between the shift control member 104 and the positioning of the automatic transmission into at least one gear position such as the first gear position. In the various exemplary embodiments disclosed herein, shift control mechanisms are provided that can be adapted to existing shift systems, such as shift systems for use with a vehicle steering system, so as to provide a style of artificial feel that can be tuned to provide a more positive positioning of the column shift mechanism in sync with the vehicle transmission.

As shown in FIGS. 1-10, in an exemplary embodiment, a shift control device 100 for an automatic transmission comprises a shift control bracket 102 mounted to a vehicle, a shift control member 104 configured for manipulation by an operator so as to affect control over a shift mechanism of a vehicle transmission (not shown), and an artificial feel mechanism.

A shift control member 104 may comprise a lever, a knob, a wheel, a slider or any other mechanism known in the art for facilitating mechanical interaction between a vehicle operator and the vehicle. Most commonly, a shift control member 104 comprises a shift lever cantilevered from the steering column. Other common examples include a console or floor-mounted shift lever. Less common examples include a dash-mounted selector slide-switch.

The artificial feel mechanism is mechanically coupled to the shift control member 104 and is configured and arranged for providing tactile feedback to the vehicle operator through the shift control member 104. The artificial feel mechanism comprises a sensor 108, a controller 110, and a piezoelectric element 112. The sensor 108 is configured and arranged for detecting a position of the shift mechanism of the vehicle transmission and sending a signal 114 that is indicative of the position of the shift mechanism. For example, the sensor 108 may be a hall effect or other proximity-based sensor 108 disposed in the transmission for detecting whether and when components of the transmission are in proper positional alignment such as they are when the transmission is in gear. Alternatively, the sensor 108 may comprise a pair of electrical contacts that are positioned such that a circuit is completed when the mechanical components are properly aligned or engaged. The selection of an appropriate sensor 108 and the manner of its implementation in a particular transmission shift mechanism depends upon a number of factors beyond the scope of this disclosure but will nonetheless be apparent to one of ordinary skill in the art.

The controller 110 may comprise a microprocessor 118 coupled to a memory storage device 120 and may be configured for receiving the signal 114 sent by the sensor 108. In one embodiment, the sensor 108 is configured to send the signal 114 wirelessly (e.g., via radio signal 114 transmission), and, accordingly, the controller 110 includes a receiver 106 configured for receiving the wireless signal 114. In another embodiment, the sensor 108 is configured to send an electrical signal 114 to the controller 110 through a wire. In yet another embodiment, the sensor 108 is configured to send an optical signal 114 through an optical link. In each of these alternative embodiments, the controller 110 is configured to receive the signal 114 sent by the sensor 108, and to interpret the signal 114 so as to be able to perform its control functions in accordance with instructions (e.g., software), which may be stored in the memory storage device 120.

The controller 110 is also configured to determine, based on the signal 114, whether and in what manner to provide a control voltage 122 to the piezoelectric element 112. For example, the controller 110 may be configured to determine (in accordance with a predefined set of instructions or functionality) a magnitude or polarity of the control voltage 122 so as to cause greater or lesser degrees of action by the piezoelectric element 112. In addition, the controller 110 may be configured to determine a time-based schedule, according to which the magnitude of the control voltage 122 may vary, so as to facilitate causing time-based variations in the action of the piezoelectric element 112. Still further, in addition to being capable of determining the desired control voltage 122, and its associated characteristics, the controller 110 is configured to provide the control voltage 122 to the piezoelectric elements 112.

In some embodiments, there may be multiple piezoelectric elements 112 disposed in different locations of, and interacting in differing ways with, the shift control member 104. In some embodiments, multiple sensors 108 may be disposed in differing locations so as to provide feedback relating to multiple aspects of the operation of the transmission. It should be appreciated that the controller 110 may be capable of receiving and processing signals 114 from multiple sensors 108, for distinguishing between the signals from the multiple sensors 108, for processing the multiple signals 114 from the multiple sensors 108, and for providing individualized control voltages 122 to each of the controlled piezoelectric elements 112.

The piezoelectric element 112 is configured and arranged so as to receive the control voltage 122. In addition, the piezoelectric element 112 is configured and arranged to apply a mechanical force so as to provide tactile feel to the vehicle operator. In some embodiments, the tactile feel that is to be provided may be a simulated vibration of the shift control member 104, so as to simulate a grinding of the transmission gears as when the clutch of a manual transmission vehicle is released while the gears are not properly engaged. Such a tactile feel may be provided by imposition of a cyclic impulse upon the shift control member 104.

In other embodiments, the tactile feel that is to be provided simulates the movement of the shift control member 104 toward or away from a mechanical detent of a mechanical linkage assembly. Such a tactile feel may be provided by providing a variable resistance to movement of the shift control member 104 or reinforcement of the movement of the shift control member 104. Accordingly, the piezoelectric element 112 is configured to operate in a manner that depends upon the control voltage 122. In addition, each piezoelectric element 112 is configured and arranged so as to mechanically resist (or mechanically reinforce) movement of the shift control member 104 relative to the shift control bracket 102, thereby providing tactile feedback to the vehicle operator.

In an exemplary embodiment, the shift control member 104 may be mechanically coupled to the shift mechanism of the vehicle transmission. For example, the shift control member 104 may comprise a lever arm that rotates about a pivot while causing a shift shaft 124 to rotate about a shift shaft axis 126. Accordingly, the shift control member 104 is mechanically coupled to the shift mechanism of the vehicle transmission by a shift shaft 124 that is configured to rotate about the shift shaft axis 126 as the vehicle transmission is shifted from one gear position to the next. In accordance with such embodiments, the piezoelectric element 112 may be fixed to the shift control bracket 102 and configured and arranged to provide a mechanical resistance to rotation of the shift shaft 124 about the shift shaft axis 126 relative to the shift control bracket 102. For example, the piezoelectric element 112 may be configured as an annular ring, and disposed about the shift shaft 124. Thus, when a control voltage 122 is applied to the annular piezoelectric element 112, a strain (i.e., a change in physical dimension) may be induced in the piezoelectric element 112, with the strain being related to the magnitude of the control voltage 122. As a result, the piezoelectric element 112 may be enabled to press against and thereby mechanically interfere with the rotation of the shift shaft 124 relatively to the shift control bracket 102.

In an exemplary embodiment, the shift control member 104 may be mechanically coupled to the shift mechanism of the vehicle transmission by a cam lever 128 that is configured to rotate about a spindle 130 as the vehicle transmission is shifted from a first gear position to a second gear position. In accordance with such embodiments, the piezoelectric element 112 may be fixed to the spindle 130 and configured and arranged to provide a mechanical resistance to rotation of the cam lever 128 about the spindle 130. For example, the piezoelectric element 112 may be configured as a cylinder, and may be disposed between the spindle 130 and the cam lever 128. Alternatively, the piezoelectric element 112 may be configured as a rib or ridge or other structure 116 disposed along the spindle 130, between the spindle 130 and the cam lever 128 such that, when energized, the piezoelectric element 112 interferes with the otherwise uninhibited movement of the cam lever 128 about the spindle 130.

In another exemplary embodiment, the shift control member 104 may be mechanically coupled to the shift mechanism of the vehicle transmission by a cylindrical link 132. For example, the coupling may include a cable or other tension member disposed within a sheath or other compression member such that movements of the cable relative to the sheath cause the shift mechanism to be actuated. Other similar embodiments are also possible including a tension/compression member such as a control rod 134 disposed within a rigid, co-axial cylinder 136 for opposing the tension/compression action of the control rod 134. In such embodiments, the cylindrical link 132 being configured such that one of the components (e.g., the control rod 134) moves (e.g., linearly) along a longitudinal axis of the cylindrical link 132 relatively to the co-axial cylinder 136 as the vehicle transmission is shifted from one gear position to another gear position.

To provide tactile feedback in such embodiments, a piezoelectric element 112 may be disposed between the components (e.g., between the co-axial cylinder 136 and the control rod 134), and the piezoelectric element 112 may be configured and arranged to provide a mechanical resistance to relative movement between the components (e.g., between of the control rod 134 and the co-axial cylinder 136). For example, the piezoelectric element 112 may be configured as a cylinder and fixed to the control rod 134. Alternatively, the piezoelectric element 112 may be fixed to the co-axial cylinder 136. Still further, the piezoelectric element 112 may be configured as any structure 116 arranged to selectively interfere with relative movement between the components of the mechanical linkage when energized by a control voltage 122.

It should be appreciated that an exemplary embodiment may include a combination of one or more piezoelectric elements 112 that may be individually controlled so as to provide a desired tactile feedback characteristic that is coordinated (via feedback provided by the sensor 108(*s*) and operation of the controller 110) with the sensed operation of the shift mechanism. Accordingly, the shift control member 104 may be mechanically coupled to the shift mechanism of the vehicle transmission by a shift shaft 124 that is configured to rotate about a shift shaft axis 126 as the vehicle transmission is shifted from a first gear position to a second gear position, and the shift control member 104 may also be mechanically coupled to the shift mechanism of the vehicle transmission by a cam lever 128 that is configured to rotate about a spindle 130 as the vehicle transmission is shifted from a first gear position to a second gear position, and the shift control member 104 may further be mechanically coupled to the shift mechanism of the vehicle transmission by a cylindrical link 132 comprising a control rod 134 disposed within a co-axial cylinder 136.

In such an embodiment, a first piezoelectric element 112 may be fixed to the shift control bracket 102 and configured and arranged to provide a mechanical resistance to rotation of the shift shaft 124 about the shift shaft axis 126 relative to the shift control bracket 102 while a second piezoelectric element 112 is fixed to the spindle 130 and configured and arranged to provide a mechanical resistance to rotation of the cam lever 128 about the spindle 130 and while a third piezoelectric element 112 is disposed between the co-axial cylinder 136 and the control rod 134 and configured and arranged to provide a mechanical resistance to movement of the control rod 134 relative to the co-axial cylinder 136.

In addition to the mechanical linkage schemes described above, the shift control member 104 may also be electronically coupled to the shift mechanism of the vehicle transmission such that a movement of the shift control member 104 relative to the shift control bracket 102 causes an electronic signal 114 to be sent to an electronic shift actuator. In accordance with such embodiments, the electronic shift actuator being configured and arranged to effect control over the shift mechanism in response to the electronic signal 114. The shift control member 104 may nonetheless be mechanically coupled to a first member that is configured to rotate relative to a second member when the shift control member 104 moves relative to the shift control bracket 102. Accordingly, the piezoelectric element 112 may be configured and arranged to provide a mechanical resistance to rotation of the first member relative to the second member. Similarly, the shift control member 104 may be mechanically coupled to a first member that is configured to translate relative to a second member when the shift control member 104 moves relative to the shift control bracket 102. Accordingly, the piezoelectric element 112 may be configured and arranged to provide a mechanical resistance to translation of the first member relative to the second member.

In addition to the above-described mechanical and electrical coupling between the shift control member 104 and the shift mechanism, the shift control member 104 may also be wirelessly coupled to the shift mechanism of the vehicle transmission such that a movement of the shift control member 104 relative to the shift control bracket 102 causes a radio signal 114 to be sent for receipt by a radio shift actuator. Accordingly, the radio shift actuator may be configured and arranged to effect control over the shift mechanism in response to the radio signal 114. Finally, the shift control member 104 may be optically coupled to the shift mechanism of the vehicle transmission such that a movement of the shift control member 104 relative to the shift control bracket 102 causes an optical signal 114 to be sent to an optical shift actuator. Accordingly, the optical shift actuator may be configured and arranged to effect control over the shift mechanism in response to the optical signal 114.

Accordingly, when calibrated properly, an operational relationship is established between the shift control member 104 and the gear positions of the automatic transmission (not shown).

In an exemplary embodiment, the shift control bracket 102 cooperates with the shift control member 104 to define one or more detents positioned along the path, with the at least one of the detents corresponding to the first gear position. As a result, the operator may be enabled to experience a tactile feel produced by the interaction of the piezoelectric element 112(*s*) 112 and the mechanic components. The tactile feel experienced by the operator may therefore be set so that an operator may perceive a mechanical resistance typically associated with a shifting of a transmission even though no such mechanical resistance may be produced by the transmission being shifted.

It should be appreciated that the characteristics of a particular control voltage 122 scheme (i.e., time-dependent magnitude of the control voltage 122 to be applied to a piezoelectric element 112) may be shaped and configured so as to provide desirable variations in resistance and/or assistance to movement of the shift control member 104 dependent upon position. The voltages and the timing of their application to the piezoelectric elements 112 may be adjusted so as to correspond to positions of the gears of the automatic transmission or to provide any other tactile feedback (e.g., a sensation of gear grinding, a sensation of winding out the gears to relatively high engine rpm) to a vehicle operator.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description.

Having thus described the invention, it is claimed:

1. A shift control device for an automatic transmission, comprising:
   a shift control bracket mounted to a vehicle;
   a shift control member configured for manipulation by an operator so as to effect control over a shift mechanism of a vehicle transmission;
   a piezoelectric element mechanically coupled to the shift control member;
   a sensor being configured and arranged for detecting a position of the shift mechanism of the vehicle transmission and sending a signal that is indicative of the position of the shift mechanism;
   a controller being configured for receiving the signal, determining, based on the signal, a control voltage to be applied to the piezoelectric element, and providing the control voltage to the piezoelectric element;
   the piezoelectric element being configured and arranged so as to receive the control voltage and to apply a mechanical force that depends upon the control voltage and that is configured and applied so as to mechanically resist movement of the shift control member relative to the shift control bracket;
   a shift shaft that mechanically couples the shift control member to the shift mechanism of the vehicle transmission, the shift shaft being configured to rotate about a shift shaft axis as the vehicle transmission is shifted from a first gear position to a second gear position; and
   wherein the piezoelectric element is fixed to the shift control bracket and configured and arranged to provide a mechanical resistance to rotation of the shift shaft about the shift shaft axis relative to the shift control bracket.

2. The shift control device of claim 1, wherein the piezoelectric element is configured as an annular ring and is disposed about the shift shaft.

3. The shift control device of claim 1:
   wherein the shift control member is mechanically coupled to the shift mechanism of the vehicle transmission by a cam lever that is configured to rotate about a spindle as the vehicle transmission is shifted from a first gear position to a second gear position; and
   wherein the piezoelectric element is fixed to the spindle and configured and arranged to provide a mechanical resistance to rotation of the cam lever about the spindle.

4. A shift control device for an automatic transmission, comprising:
   a shift control bracket mounted to a vehicle;
   a shift control member configured for manipulation by an operator so as to effect control over a shift mechanism of a vehicle transmission;
   a piezoelectric element mechanically coupled to the shift control member;
   a sensor being configured and arranged for detecting a position of the shift mechanism of the vehicle transmission and sending a signal that is indicative of the position of the shift mechanism; and
   a controller being configured for receiving the signal, determining, based on the signal, a control voltage to be applied to the piezoelectric element, and providing the control voltage to the piezoelectric element;

the piezoelectric element being configured and arranged so as to receive the control voltage and to apply a mechanical force that depends upon the control voltage and that is configured and applied so as to mechanically resist movement of the shift control member relative to the shift control bracket;

a cam lever that mechanically couples the shift control member to the shift mechanism of the vehicle transmission, the cam lever being configured to rotate about a spindle as the vehicle transmission is shifted from a first gear position to a second gear position; and wherein the piezoelectric element is fixed to the spindle and configured and arranged to provide a mechanical resistance to rotation of the cam lever about the spindle.

5. The shift control device of claim 4, wherein the piezoelectric element is configured as a cylinder, and is disposed between the spindle and the cam lever.

6. The shift control device of claim 4, wherein the piezoelectric element is disposed along the spindle, between the spindle and the cam lever.

7. A shift control device for an automatic transmission, comprising:

a shift control bracket mounted to a vehicle;

a shift control member configured for manipulation by an operator so as to effect control over a shift mechanism of a vehicle transmission;

a piezoelectric element mechanically coupled to the shift control member;

a sensor being configured and arranged for detecting a position of the shift mechanism of the vehicle transmission and sending a signal that is indicative of the position of the shift mechanism;

a controller being configured for receiving the signal, determining, based on the signal, a control voltage to be applied to the piezoelectric element, and providing the control voltage to the piezoelectric element;

the piezoelectric element being configured and arranged so as to receive the control voltage and to apply a mechanical force that depends upon the control voltage and that is configured and applied so as to mechanically resist movement of the shift control member relative to the shift control bracket;

wherein the shift control member is mechanically coupled to the shift mechanism of the vehicle transmission by a shift shaft that is configured to rotate about a shift shaft axis as the vehicle transmission is shifted from a first gear position to a second gear position and the piezoelectric element is fixed to the shift control bracket and configured and arranged to provide a mechanical resistance to rotation of the shift shaft about the shift shaft axis relative to the shift control bracket;

wherein the shift control member is mechanically coupled to the shift mechanism of the vehicle transmission by a cam lever that is configured to rotate about a spindle as the vehicle transmission is shifted from the first gear position to the second gear position and a second piezoelectric element is fixed to the spindle and configured and arranged to provide the mechanical resistance to rotation of the cam lever about the spindle; and wherein the shift control member is mechanically coupled to the shift mechanism of the vehicle transmission by a cylindrical link comprising a control rod disposed within a co-axial cylinder, the cylindrical link being configured such that the control rod moves along a longitudinal axis of the cylindrical link as the vehicle transmission is shifted from the first gear position to the second gear position, and a third piezoelectric element is disposed between the co-axial cylinder and the control rod and configured and arranged to provide the mechanical resistance to movement of the control rod relative to the co-axial cylinder.

\* \* \* \* \*